(No Model.)

H. N. LIBBEY.
GATE VALVE.

No. 577,924. Patented Mar. 2, 1897.

Witnesses.
Lauritz N. Möller
Charles A. Harris

Inventor.
Henry N. Libbey.
by Alban Andrén his atty.

UNITED STATES PATENT OFFICE.

HENRY N. LIBBEY, OF BOSTON, MASSACHUSETTS.

GATE-VALVE.

SPECIFICATION forming part of Letters Patent No. 577,924, dated March 2, 1897.

Application filed June 20, 1896. Serial No. 596,260. (No model.)

*To all whom it may concern:*

Be it known that I, HENRY N. LIBBEY, a citizen of the United States, and a resident of Boston, in the county of Suffolk and State of Massachusetts, have invented new and useful Improvements in Gate-Valves, of which the following, taken in connection with the accompanying drawings, is a specification.

This invention relates to improvements in gate-valves for steam and liquids; and it has for its object to permit the steam or liquid in the outlet end to escape freely when the valve is closed, which is very desirable in case of repairs to the pipes beyond the valve or for the purpose of preventing the liquid in the pipe from freezing in cold weather, as will hereinafter be more fully shown and described, reference being had to the accompanying drawings, wherein—

Figure 1:
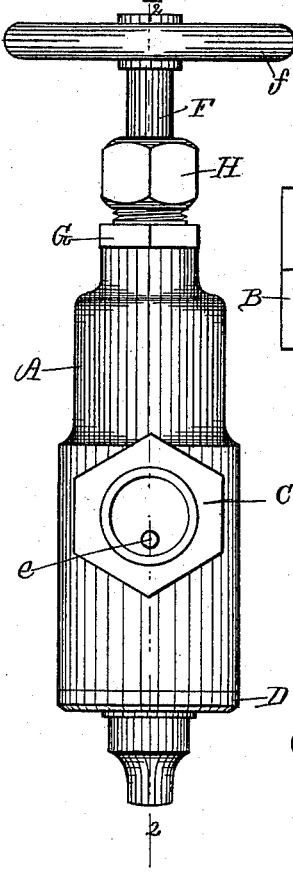
Figure 4:
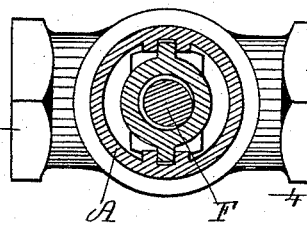
Figure 2:
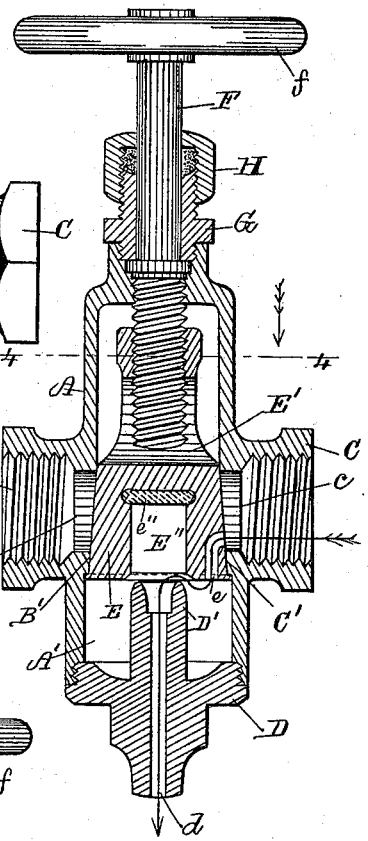
Figure 3:
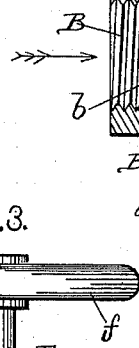
Figure 5:
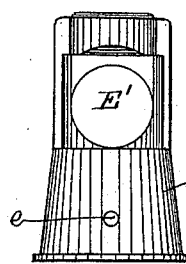
Figure 6:
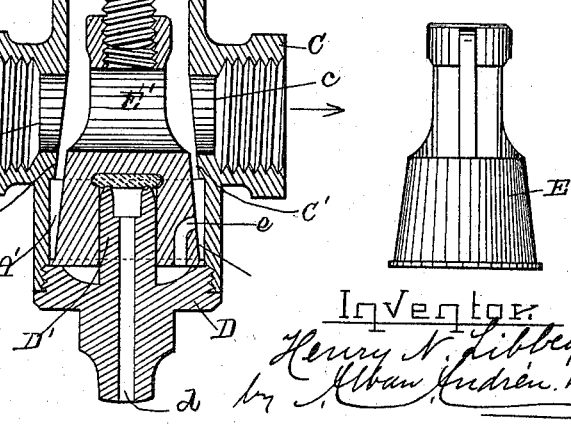

Figure 1 represents an end view of the improved valve, showing its gate closed. Fig. 2 represents a vertical section on the line 2 2 in Fig. 1, showing the gate closed. Fig. 3 represents a similar vertical section showing the gate open. Fig. 4 represents a cross-section on the line 4 4 shown in Fig. 2. Fig. 5 represents a detail side view of the gate or plug, and Fig. 6 represents an end view of said gate or plug.

Similar letters refer to similar parts wherever they occur on the different parts of the drawings.

In the drawings, A represents the valve-shell having supply branch B and delivery branch C, as shown.

B' and C' are perforated valve-seats at the inner ends of the respective branch B and C. Below the said branches B C the valve-shell is extended as a chamber A', to which is detachably secured the screw-threaded perforated cap or cover D, as shown. Centrally within the valve-shell is located the longitudinally-adjustable tapering gate or plug E, having a transverse perforation E', coinciding, or nearly so, with the perforations *b c* in the valve-seats B' C' when the valve is open, as fully shown in Fig. 3.

The plug or valve E is guided in a suitable manner within the shell A and is operated up and down within said shell by means of a screw-threaded valve-spindle F, journaled in the upper end of said shell and provided at its upper end with a suitable hand-wheel *f*, as is common in devices of this kind.

G represents the gland, and H the stuffing-box for the valve-spindle, as usual.

*e* is a perforation at one side of the valve or plug E for the purpose of letting out the water from the branch C and pipes connected thereto when the valve is closed, as shown in Fig. 2.

The cap D has an upwardly-projecting valve-stem D', provided with a central discharge-opening *d*, as shown in Figs. 2 and 3.

The valve or plug E is provided with a recess E'' on its under side adapted to receive the stem D' when the valve is open, as shown in Fig. 3. In the bottom of said recess E'' is a leather or equivalent valve-seat *e''*, adapted to close against the upper end of the hollow stem D' when the valve is open, as shown in Fig. 3.

The operation is as follows: The valve is opened by moving the plug E downward, as shown in Fig. 3, when communication is established between the branches B and C, and during such position of the said plug the vent *d* is closed by the valve *e''* being forced against the upper end of the hollow stem D', as shown in said Fig. 3. When the plug E is raised upward and closed against the valve-seats B' C', the exhaust *d* is in open communication with the branch C by means of the valve-perforation *e*, as shown in Fig. 2, thus permitting the liquid or back pressure in the branch C and pipes connected thereto to escape through the port *e* and the perforation *d* in the stem D', as fully represented in Fig. 2.

Having thus fully described the nature, construction, and operation of my invention, I wish to secure by Letters Patent and claim—

In a gate-valve having supply and delivery branches and valve-seats thereon combined with a perforated adjustable plug having an exhaust-port in communication with the delivery branch, a valve-seated recess in the under side of said plug and a hollow stem in the lower portion of the valve-shell, said stem having an exhaust-vent and having its upper end adapted to be closed against the valve-seated recess in the plug substantially as and for the purpose set forth.

In testimony whereof I have signed my name to this specification, in the presence of two subscribing witnesses, on this 20th day of May, A. D. 1896.

HENRY N. LIBBEY.

Witnesses:
ALBAN ANDRÉN,
GEORGE C. WHORF.